(12) United States Patent
Edwards

(10) Patent No.: US 7,239,594 B2
(45) Date of Patent: *Jul. 3, 2007

(54) SELF-REFERENCED HOLOGRAPHY USING ELEMENT FORMED ON A HOLOGRAPHIC MEDIUM

(75) Inventor: Jathan D. Edwards, Afton, MN (US)

(73) Assignee: Imation Corp., Oakdale, MN (US)

( * ) Notice: Subject to any disclaimer, the term of this patent is extended or adjusted under 35 U.S.C. 154(b) by 819 days.

This patent is subject to a terminal disclaimer.

(21) Appl. No.: 10/359,877

(22) Filed: Feb. 7, 2003

(65) Prior Publication Data

US 2004/0156297 A1 Aug. 12, 2004

(51) Int. Cl.
*G11B 7/00* (2006.01)
(52) U.S. Cl. .............. 369/103; 369/112.28; 359/30
(58) Field of Classification Search .......... 369/103
See application file for complete search history.

(56) References Cited

U.S. PATENT DOCUMENTS

| 4,104,489 | A  |   | 8/1978  | Satoh et al.       |          |
|-----------|----|---|---------|--------------------|----------|
| 4,597,630 | A  | * | 7/1986  | Brandstetter et al.| 359/9    |
| 5,307,184 | A  |   | 4/1994  | Nishiwaki et al.   |          |
| 5,642,210 | A  | * | 6/1997  | Stoll et al.       | 359/10   |
| 5,719,691 | A  |   | 2/1998  | Curtis et al.      |          |
| 6,108,110 | A  | * | 8/2000  | Orlov et al.       | 359/22   |
| 6,538,776 | B2 |   | 3/2003  | Edwards            |          |
| 6,545,808 | B1 | * | 4/2003  | Ehbets et al.      | 359/566  |
| 2002/0154590 | A1 | * | 10/2002 | Vezenov et al.  | 369/112.26 |
| 2005/0231777 | A1 | * | 10/2005 | Curtis          | 359/35   |

\* cited by examiner

*Primary Examiner*—Wayne Young
*Assistant Examiner*—Van Pham
(74) *Attorney, Agent, or Firm*—Eric D. Levinson

(57) ABSTRACT

The invention is directed to self-referenced holographic recording techniques that make use of an element of a holographic medium to create a reference beam from a zero frequency Fourier component of a data encoded object beam. In other words, the self-referencing element may be formed on the holographic medium, rather then being a separate element of the holographic recording system. The element may comprise a diffusive element on the medium, designed to create a reference beam having controlled angles, phase and/or amplitude.

25 Claims, 13 Drawing Sheets

SELF-REFERENCED HOLOGRAPHY USING ELEMENT FORMED ON A HOLOGRAPHIC MEDIUM

TECHNICAL FIELD

The invention relates to holography and, more particularly, to holographic data storage.

BACKGROUND

Many different types of data storage media have been developed to store information. Traditional data storage media, for instance, include magnetic media, optical media, and mechanical media to name a few. Increasing data storage density is a paramount goal in the development of new or improved types of data storage media.

In traditional media, individual bits are stored as distinct mechanical, optical, or magnetic changes on the surface of the media. For this reason, medium surface area generally poses physical limits on data densities of traditional media.

Holographic data storage media can offer higher storage densities than traditional media. In a holographic medium, data is stored throughout the volume of the medium rather than the medium surface. Moreover, data can be superimposed within the same medium volume using multiplexing techniques. For these reasons, theoretical holographic storage densities can approach tens of terabits per cubic centimeter.

In holographic data storage media, entire pages of information, e.g., bit maps, can be stored as optical interference patterns within a photosensitive optical material. This is done by intersecting two coherent laser beams within the optical material. The first laser beam, called the object beam, contains the information to be stored; and the second, called the reference beam, interferes with the object beam to create an interference pattern that can be stored in the holographic recording material as a hologram. In most conventional holographic recording systems, the object beam and reference beam ordinarily follow separate optical paths.

When a stored hologram is illuminated with only the reference beam, some of the reference beam light is diffracted by the hologram interference pattern. Moreover, the diffracted light can be directed to reconstruct the original object beam. Thus, by illuminating a recorded hologram with the reference beam, the data encoded in the object beam can be reconstructed and detected by a data detector such as a camera.

Self-referenced holography as described in U.S. patent application Ser. No. 09/813,066, filed Mar. 20, 2001 for Jathan Edwards entitled "Self-Referenced Holographic Storage," can improve holographic data storage systems. In self-referenced holography, the object beam and reference beam follow a common optical path. In particular, in self-referenced holography, the reference beam is created from a zero frequency Fourier component of the object beam. As described in U.S. patent application Ser. No. 09/813,066, the creation of the reference beam from the zero frequency Fourier component of the object beam can be achieved using a lens or a mirror. The entire content of U.S. patent application Ser. No. 09/813,066 is incorporated herein by reference.

For example, a lens can be positioned in the optical path of the object beam before the medium to optically direct the zero frequency component of the object beam in order to create a reference beam. Alternatively, a mirror can be positioned in the optical path of the object beam after the medium to optically reflect the zero frequency component of the object beam after it passes through the medium. Generally, self-referenced holography can yield a number of advantages in a holographic data storage system, including the realization of a single optical path directed toward a holographic recording medium which can reduce the size of the system and possibly reduce alignment concerns.

SUMMARY

In general, the invention is directed to self-referenced holographic recording techniques that make use of an element of a holographic medium to create a reference beam from a zero frequency Fourier component of a data encoded object beam. In other words, the self-referencing element may be formed on the holographic medium itself, rather then being a separate element of the holographic recording system. For example, the holographic medium may include a diffusive element that can randomly diffuse the zero frequency Fourier component, or may diffuse the zero frequency Fourier component in an ordered or partially ordered manner. In some cases, the diffusive element of the holographic medium may be designed to create a reference beam having specific controlled angles, phase and/or amplitude.

In one embodiment, the invention provides a holographic medium comprising a holographic recording material, and an element to create a reference beam from a zero frequency Fourier component of a data encoded object beam. For example, the holographic recording medium may include two substrates that sandwich the holographic recording material and the element may be formed on one of the substrates.

In another embodiment, the invention provides a method comprising optically directing a zero frequency Fourier component of the first optical beam using an element formed on a holographic medium to create a second optical beam, and illuminating a recording material of the holographic medium with the second optical beam and non-zero frequency Fourier components of the first optical beam.

In another embodiment, the invention provides a holographic data storage system. The system may include a laser to produce light, one or more optical elements to condition the light produced by the laser to create the object beam, and a data encoder to encode data in the object beam. The system may further include a holographic medium including a holographic recording material and an element formed on the medium to create a reference beam from a zero frequency Fourier component of a data encoded object beam, wherein the reference beam and non-zero frequency Fourier components of the object beam interfere in the holographic recording material to create a hologram.

The different embodiments may provide one or more advantages. In particular, self-referenced holography can realize a holographic system having a single optical path. In addition, removing the zero frequency Fourier component from the object beam to create the reference beam can reduce undesirable intensity of the object beam. In other words, removing the zero frequency Fourier component of the object beam can reduce or avoid undesirable overexposure of photosensitive holographic recording material during holographic recording.

Also, incorporation of the self-referencing element on the holographic medium itself may further improve the self-referenced holographic system. By incorporating the element as part of the medium, alignment problems may be overcome. In other words, if the self-referencing element forms part of the medium, alignment of the element with the medium can be ensured. The element may be created on a substrate of the medium using replication techniques, coatings, or the like. In any case, by incorporating the self-referencing element on the holographic medium, the complexity of a holographic reading system may also be reduced.

In one example, the element on the medium may comprise a diffusive element, which can add further advantages. For example, the diffusive element may create a reference beam having desirable characteristics, such as desirable phase, angles, and intensity. By using a diffusive element on the medium to create a reference beam with particular angles, phase and amplitude, multiplexing can be improved, which can increase the storage capacity of holographic media.

Multiplexing refers to a process of recording two or more holograms in the same volume of the holographic medium, e.g., in a substantially overlapping or partially overlapping manner. The ability to reconstruct multiplexed holograms may be improved if the reference beam is created to have defined characteristics of phase, angles, amplitude, and the like. Accordingly, a diffusive element on the medium can be used to create such a reference beam having desirable angles, phase and amplitude. In other examples, however, the element may comprise a non-diffusive element such as a refractive or diffractive element.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
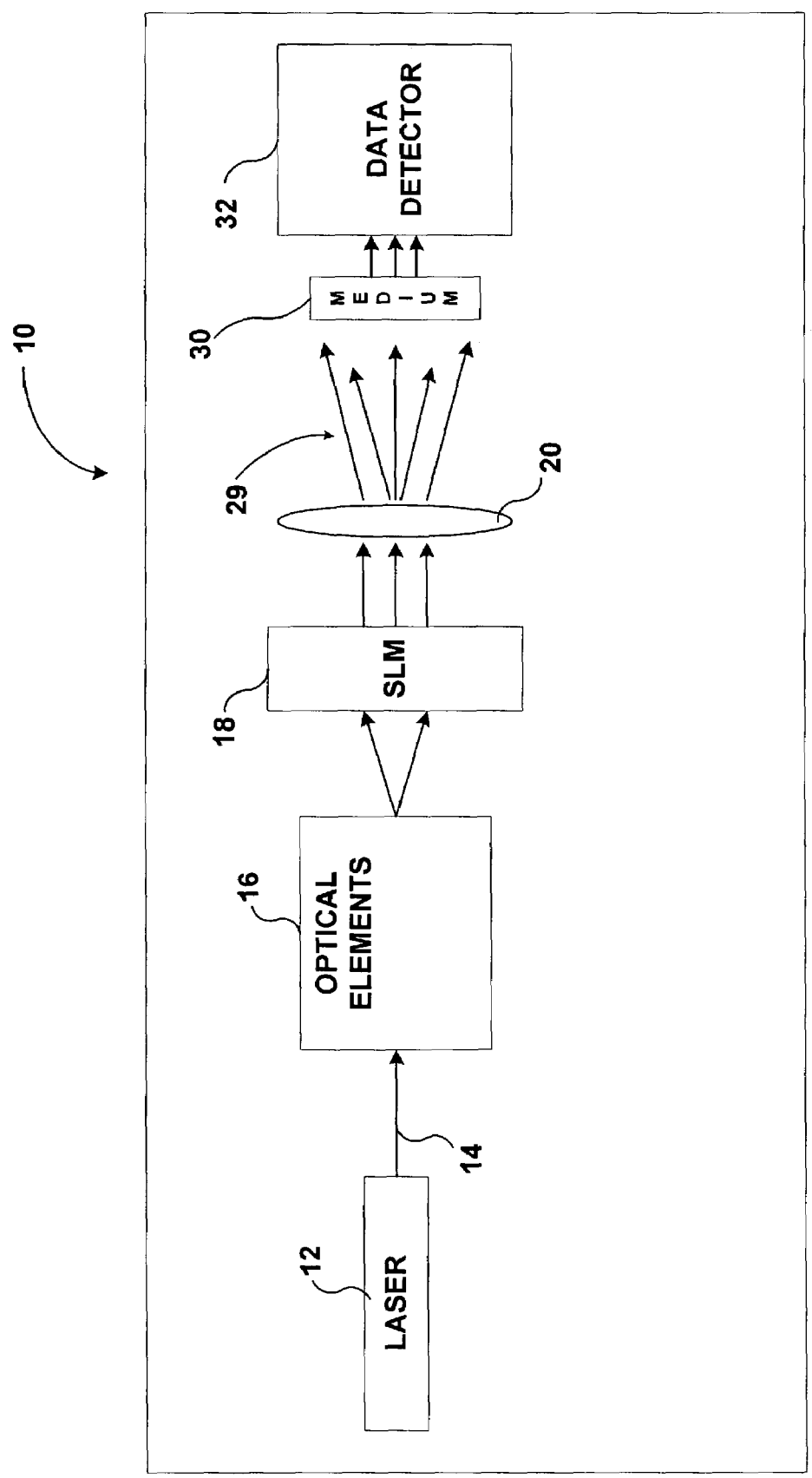
FIG. 1 is a block diagram of a self-referenced holographic recording system according to an embodiment of the invention.

The invention is directed to self-referenced holographic recording techniques that make use of an element of a holographic medium to create a reference beam. Self-referenced holography refers to holographic recording techniques in which a reference beam is created from a zero frequency Fourier component of a data encoded object beam. In particular, the zero frequency Fourier component of a data encoded object beam can be optically directed so as to interfere with the higher order components of the object beam in order to create holograms in a holographic medium. In other words, the reference beam comprises the zero frequency Fourier component of a data encoded object beam, and interferes with non-zero frequency Fourier components of the object beam to create holograms in the holographic medium. In accordance with the invention, the element used to create the reference beam from the zero frequency Fourier component of the object beam may comprise an element formed on the holographic medium.

In one example, the holographic medium may include one or more diffusive elements that can randomly diffuse the zero frequency Fourier component, or may diffuse the zero frequency Fourier component in an ordered or partially ordered manner. The diffusive element of the holographic medium may be designed to create a reference beam having particular angles, phase and amplitude, or randomness characteristics, if desired. In some embodiments, a plurality of diffusive elements may be arranged as patches, bands, spots, or the like, such that the diffusive elements comprise regions where the zero frequency Fourier component of the object beam are diffused to create the reference beam, and the intervening regions between the diffusive elements comprise regions that pass the higher order components of the object beam. Thus, the higher order components of the object beam may interfere in a holographic recording material with the diffused zero frequency Fourier component to create holograms in the recording material.

By creating the reference beam from the zero frequency Fourier component of the object beam, a holographic system having a single optical path can be realized. In addition, removing the zero frequency Fourier component from the object beam to create the reference beam can reduce undesirable intensity of the object beam. For example, the zero frequency Fourier component of the object beam may have an intensity that can overexpose photosensitive holographic recording material. Thus, by removing only the zero frequency Fourier component of the object beam and using only the zero frequency Fourier component as a reference beam, undesirable overexposure of photosensitive holographic recording material can be eliminated or reduced.

In accordance with the invention, the element used to create the reference beam from the zero frequency Fourier component of the object beam may comprise an element formed on the holographic medium. By incorporating the element as part of the medium, rather than using a separate element in the holographic system, alignment problems may be overcome. In other words, if the self-referencing element forms part of the medium, alignment of the element with the medium can be ensured during fabrication of the medium.

In some cases, the element formed on the holographic medium to create the reference beam from the zero frequency Fourier component of the object beam may comprise a diffusive element. Use of a diffusive element to create a reference beam from a zero frequency Fourier component of a data encoded object beam can provide certain advantages in holographic recording as outlined in greater detail below.

A diffusive element on the holographic medium may be configured to randomly diffuse the zero frequency Fourier component. Alternatively, a diffusive element on the medium may be configured to diffuse the zero frequency Fourier component in an ordered or defined manner, e.g., to create a reference beam having certain desirable characteristics. In other examples, the element may be a non-diffusive element, e.g., a diffractive or refractive element.

If a diffusive element is used, the diffusive element can be formed on the holographic medium to create a reference beam with particular angles, phase and amplitude, which can allow for improved multiplexing on the medium. Controlled phase of the reference beam, in particular, may improve multiplexing. Multiplexing refers to a process of recording two or more holograms in the same region of the medium, e.g., in an overlapping or partially overlapping manner. By using a diffusive element on the medium to create a reference beam with particular angles, phase and amplitude, multiplexing can be improved, which can increase the storage capacity and enable the simplified mechanisms of the shift-multiplexing method.

Typical multiplexing techniques used for holographic data storage include variations or combinations of angle, wavelength or shift multiplexing methods. As selectivity (between holograms) of the multiplexing increases, greater storage density can be achieved. This selectivity varies inversely with the correlation of the reference beam as used to record the differing overlapped holograms. In angle multiplexing, multiple holograms are differentiated as having been recorded with differing inclination angles relative to the media between the reference and object beams used to record the hologram. Readout of angle multiplexed holograms generally requires a precise reorientation of the reference beam relative to the media in order to match the initial recording condition.

In wavelength multiplexing, the differentiation between holograms is controlled by adjusting the wavelength of the coherent source for both object and reference beams used for recording. Subsequent readout of the multiple holograms generally requires replication of the precise wavelengths used during the previous recording step. In shift multiplexing, the reference beam incorporates enough angular and/or phase content such that lateral shifts of the media relative to the recording beams for each hologram provides differentiation. Subsequent readout using the shift multiplexing method generally requires the reference beams lateral position relative to the media to match the previous recording condition. Since the lateral positioning of head relative to media is more routinely implemented in a drive mechanism, the shift multiplexing method may be more advantageous relative to angle or wavelength multiplexing.

FIG. 1 is a block diagram of a self-referenced holographic recording system 10 according to an embodiment of the invention. As shown in FIG. 1, holographic recording system 10 includes a laser 12 that produces laser light 14. Light 14 passes through various optical elements 18, such as lenses, mirrors, filters or the like, to condition light 14 for effective data encoding.

A data encoder such as spatial light modulator (SLM) 18 is used to encode data in light 14. In particular, SLM 18 may encode a holographic bit map, e.g., a pixel array, in the light. The data encoded light is referred to as the object beam, as known in the art of holographic recording. A Fourier transform lens 20 is positioned to cause Fourier decomposition of the data encoded object beam.

Medium 30 is illuminated by the data encoded object beam 29. As outlined in greater detail below, medium 30 is formed with one or more elements that optically direct a zero frequency Fourier component of the data encoded object beam 29 to create a reference beam. The higher order Fourier components of the data encoded object beam, i.e., non-zero frequency Fourier components, interfere with the optically directed zero frequency Fourier component to create holograms in medium 30. In other words, the reference beam comprises only the zero frequency Fourier component of a data encoded object beam, and interferes with non-zero frequency Fourier components of the object beam to create holograms in the holographic medium. In this manner, holograms of the bit maps encoded on the object beam can be stored in medium 30.

By way of example, holographic medium 30 may take the form of a disk or card, is although the scope of the invention is not limited in that respect. In either case, the medium may have a sandwich construction in which a photosensitive material is sandwiched between two substrates. Many examples below are provided in the context of a disk shaped medium having a sandwiched construction, although the invention is not necessarily limited in that respect.

A data detector 32, such as a camera, may be positioned to detect stored holograms on medium 30 when the medium is illuminated by the reference beam only. In that case, only the zero frequency Fourier component may illuminate medium 30 so that bit maps encoded on the object beam and stored in medium 30 can be reconstructed. A filter, mask, opaque element, or the like (not shown) may be used to block the higher order components of the object beam during readout, so that medium 30 can be illuminated by the reference beam only during readout, to facilitate reconstruction of the object beam. In other words, all of the higher order components of the data encoded object beam may be blocked during readout so that only the zero frequency Fourier component illuminates medium 30 and is optically directed by medium 30 to create the reference beam.

Figure 2:
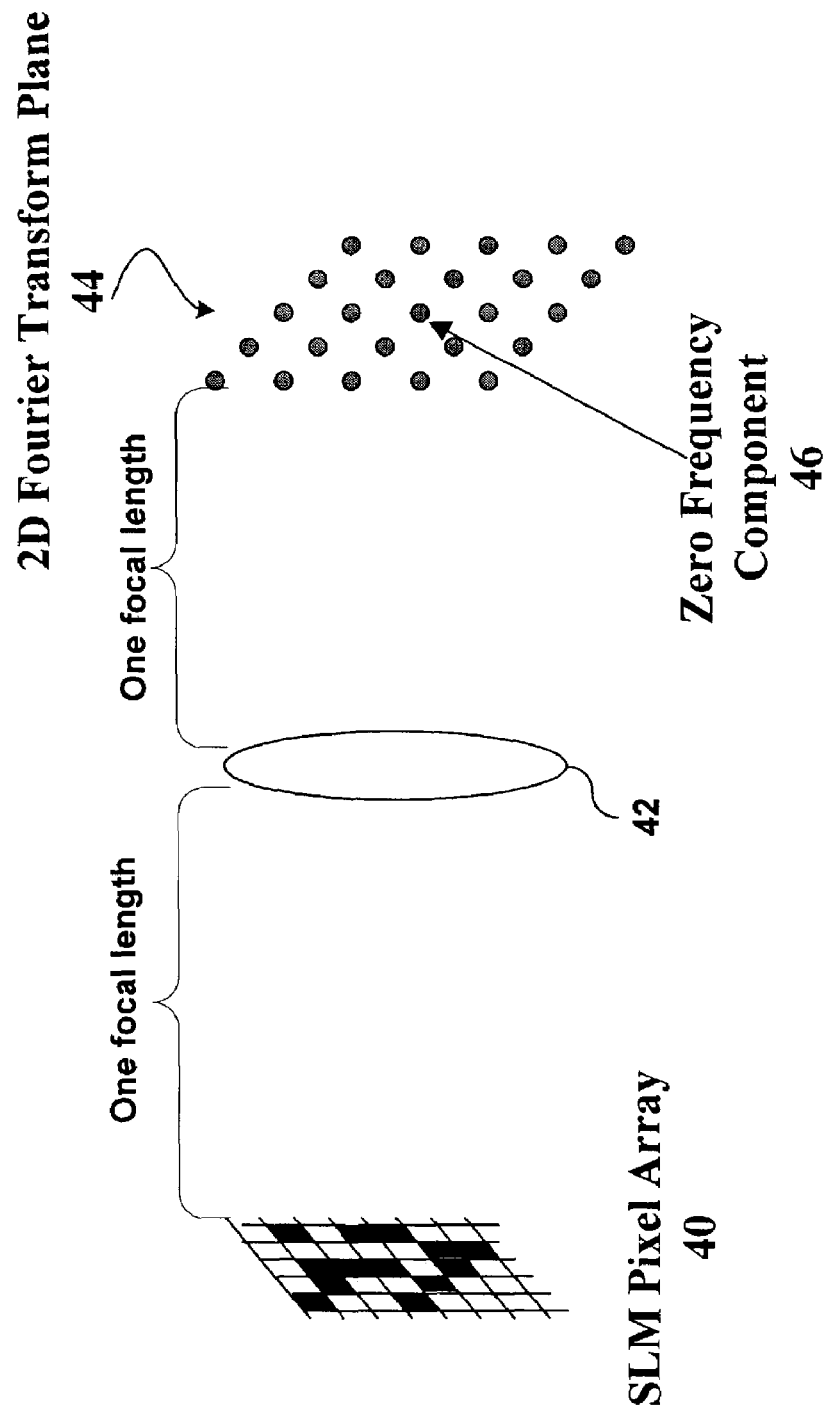
FIG. 2 is a conceptual diagram illustrating Fourier decomposition of a pixel array.

To better explain self-referenced holographic recording, a basic description of Fourier decomposition will now be provided. FIG. 2 is used to help describe Fourier decomposition. As shown in FIG. 2, an exemplary SLM pixel array 40 can be encoded as a bit map on an object beam. In particular, an SLM may be used to define pixel array 40, which may have various shapes, sizes or numbers of pixels. After passing through the SLM, the object beam may then pass through a Fourier transform lens 42 located one focal length from the SLM 40. At a distance of one additional focal length from the lens 42, the data encoded object beam appears as a collection of Fourier components in a Fourier transform plane 44. In accordance with the invention, an element formed on a holographic medium (not shown in FIG. 2) may be used to optically direct the zero frequency Fourier component 46 in order to create a reference beam.

The Fourier components contain all of the information of SLM pixel array 40. However, the encoded data is contained in the "higher order components" of the Fourier spectrum. The zero-frequency (or DC) component 46 that resides in the center of the Fourier spectrum is not a higher order component, and does not contain any of the encoded data. Rather, the zero frequency Fourier component contains only information defining the average intensity of the light of SLM pixel array 40. Moreover, this zero frequency Fourier component typically contains a significant fraction of the total amount of light in the Fourier spectrum.

In some conventional systems, the intensity of the zero frequency Fourier component in the object beam can cause problems in recording by overexposing the photosensitive recording material. In self-referenced recording, however, such overexposing can be reduced or eliminated because the zero frequency Fourier component is removed from the object beam and used as the reference beam. The need for a separate reference beam, and a separate optical path for the reference beam are also eliminated.

In accordance with an embodiment of the invention, a reference beam can be created from the zero frequency component of the Fourier spectrum using an element formed on a holographic recording medium. The element can optically direct the zero frequency component of the Fourier spectrum through the same volume of recording material as that illuminated by the higher order Fourier components.

Using the zero frequency component of the Fourier spectrum as a reference beam may address many problems of conventional holographic data storage systems. For instance, if the zero frequency component of the Fourier spectrum is used to produce the reference beam, the system may have only one optical path directed towards the medium. Moreover, the number of optical elements needed by the system, such as costly, high quality lenses may be reduced. Thus, a second reference path of optical elements can be eliminated, and the size of the system may be reduced significantly. In addition, as mentioned above, the zero frequency component of the Fourier spectrum as a reference beam can reduce overexposure problems conventionally associated with an overly intense object beam.

Also by forming the self-referencing element on the medium, alignment of the self-referencing element relative to the recording material of the medium can be ensured. In particular, fabrication of the medium can ensure that the self-referencing element is properly aligned relative to the recording material.

Figure 3:
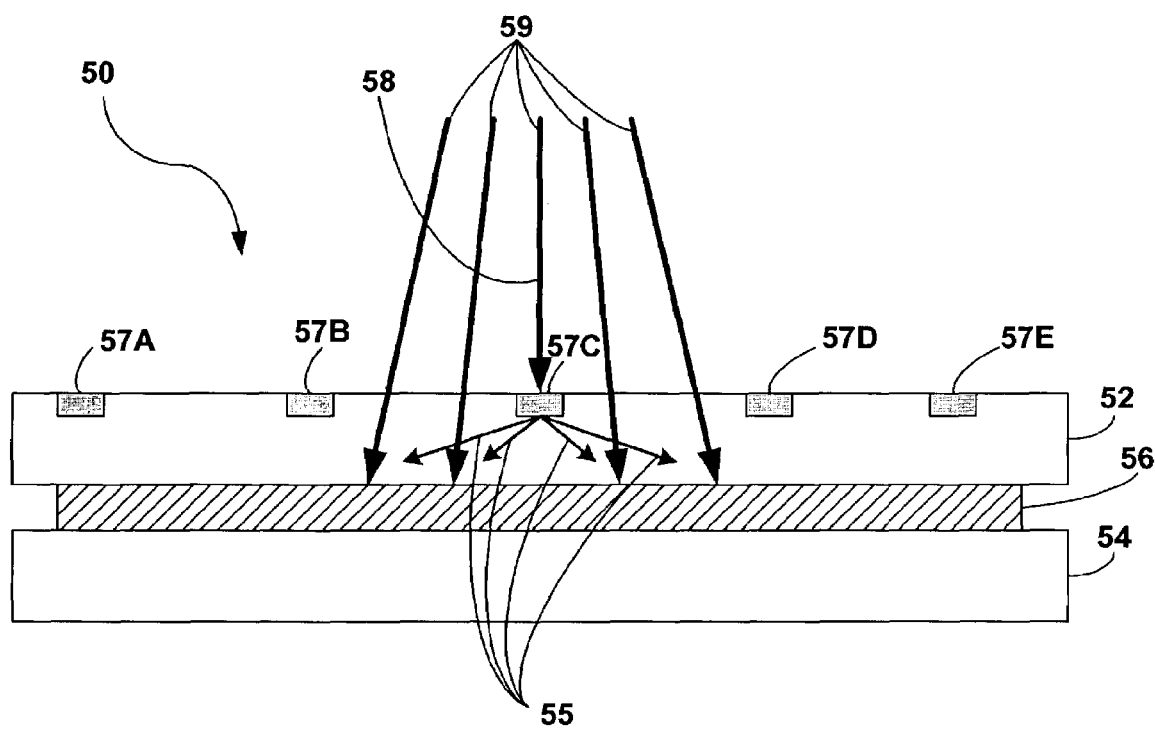
FIG. 3 is a cross-sectional side view of an exemplary holographic storage medium according to one embodiment of the invention.
Figure 4:
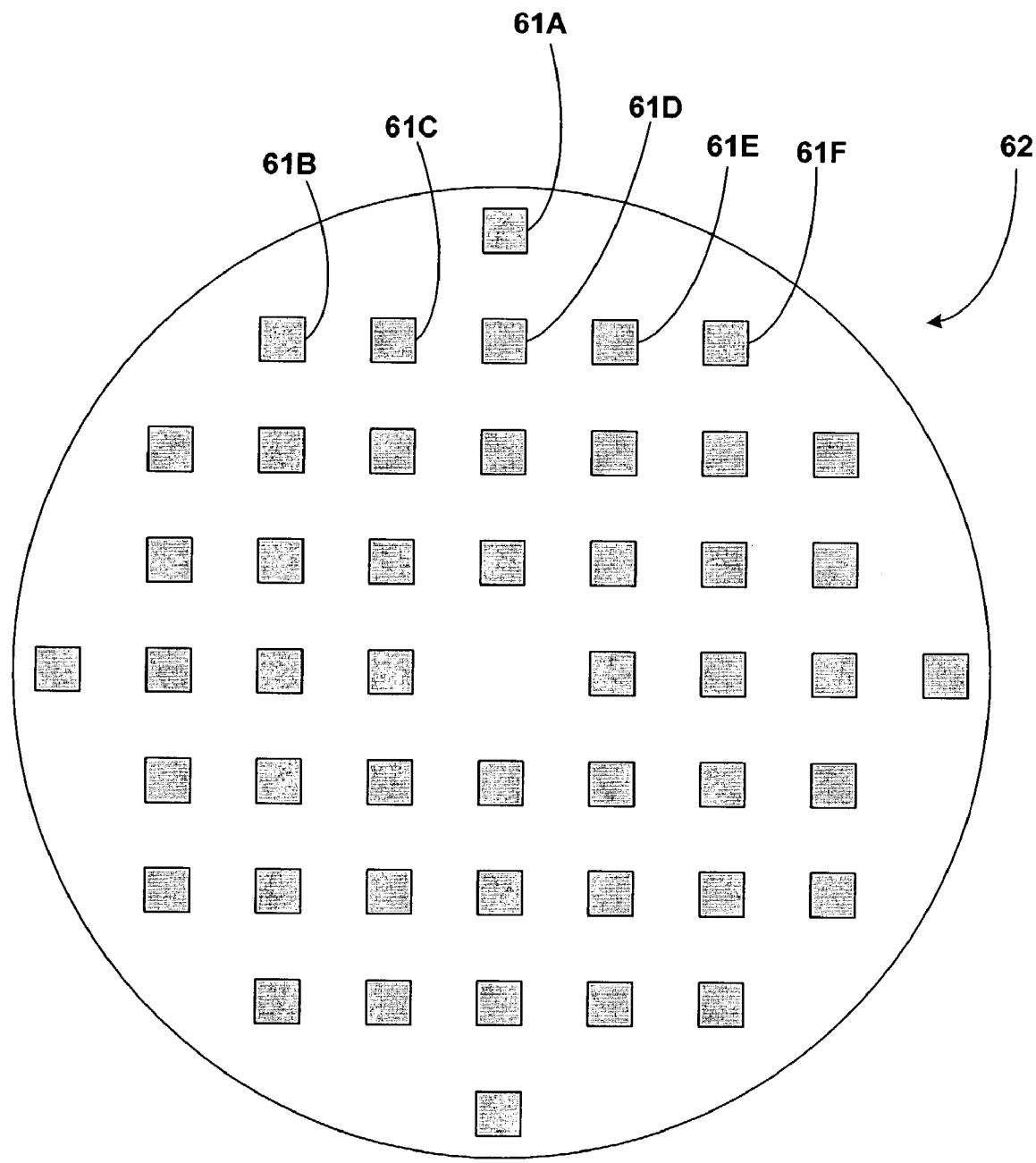
FIGS. 4-7 are exemplary top views of media according to embodiments of the invention.
Figure 5:
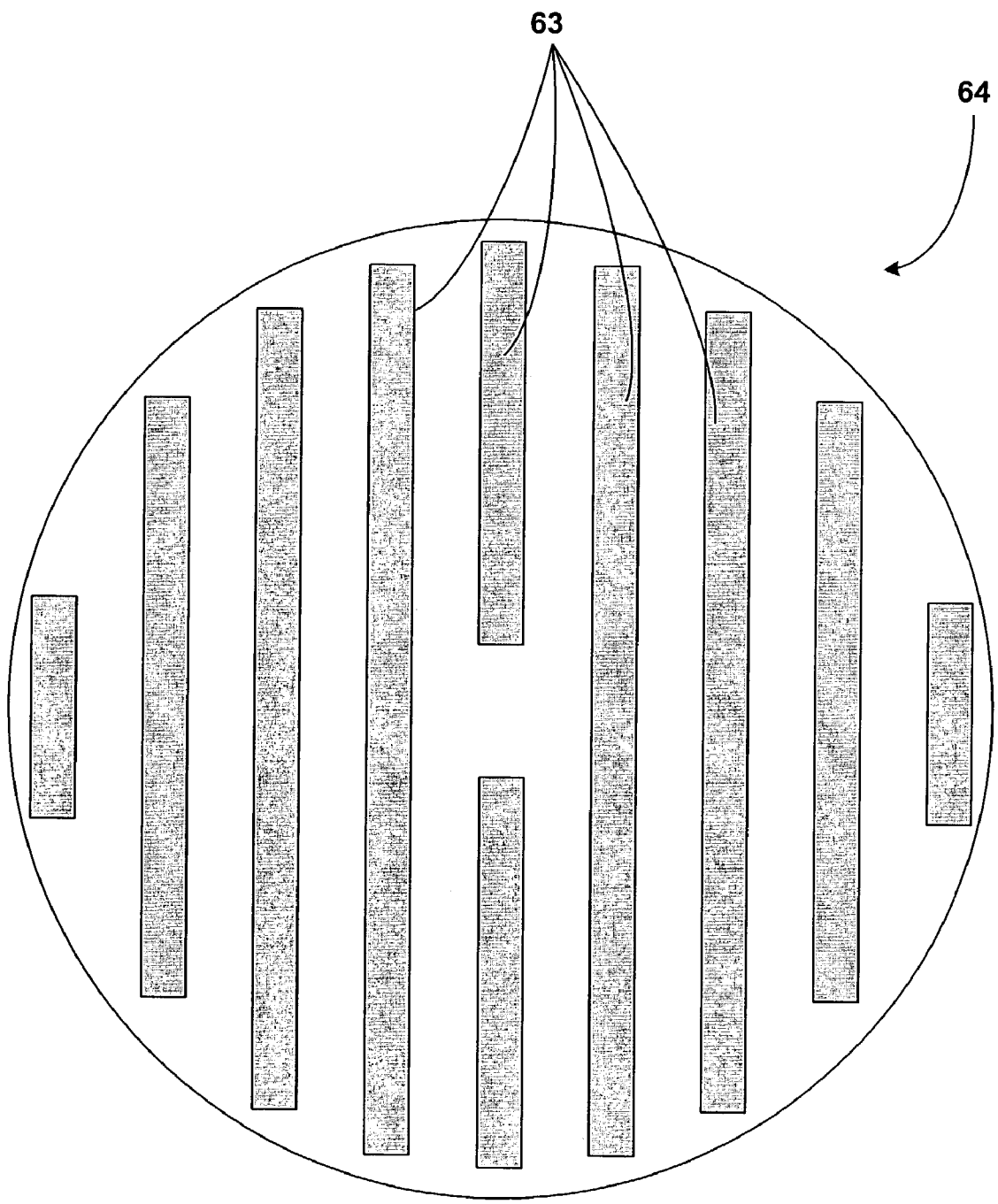
Figure 6:
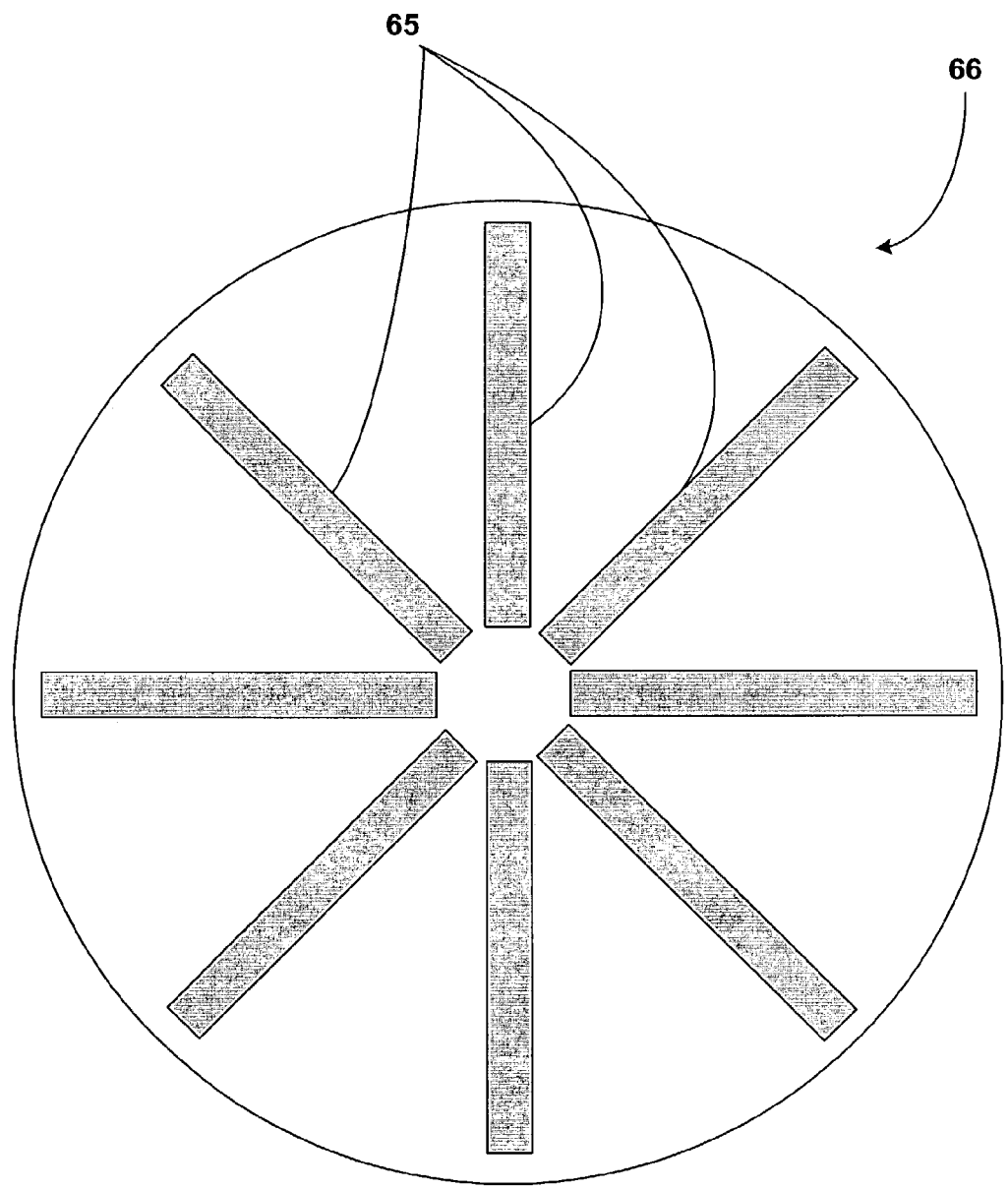
Figure 7:
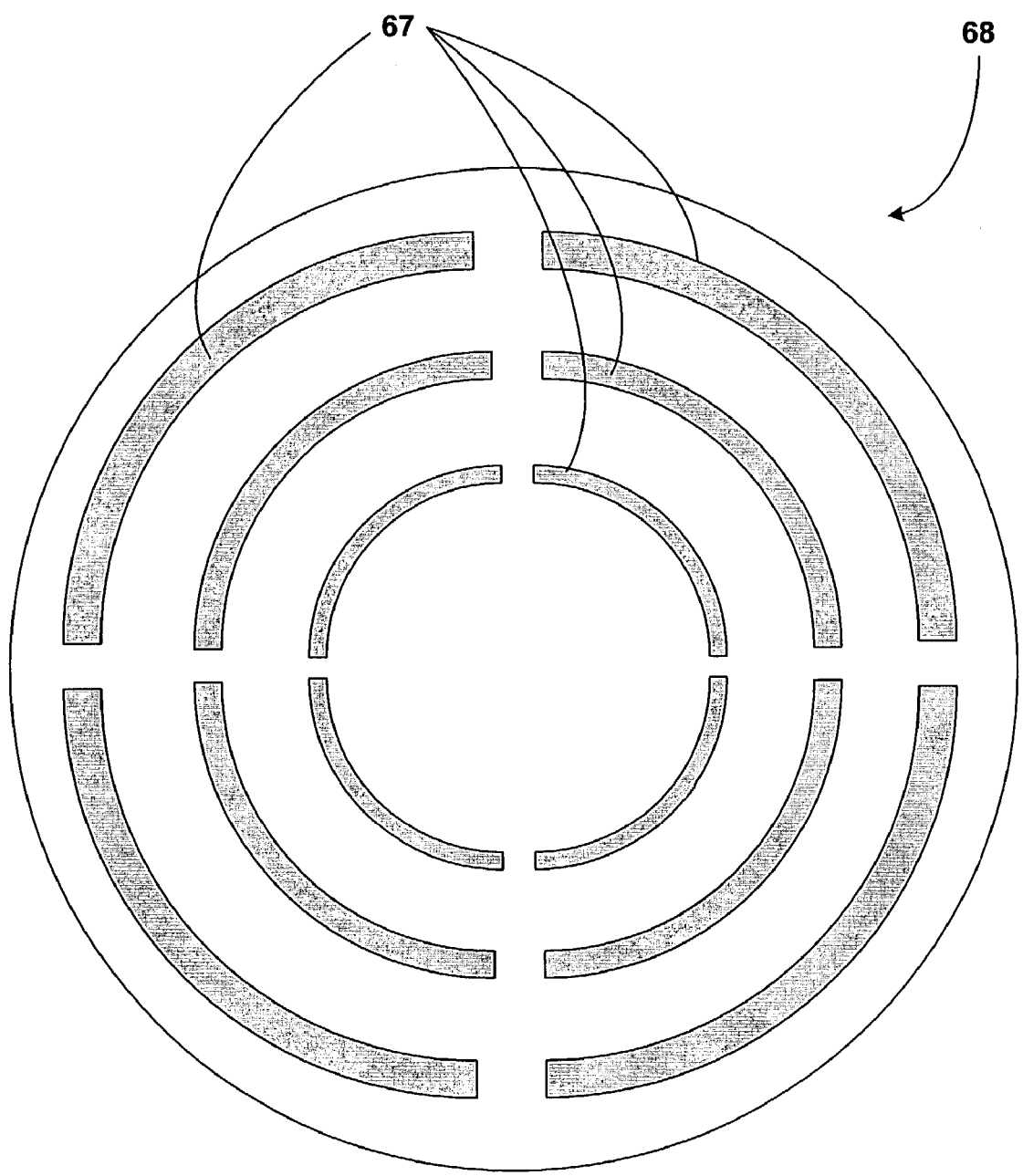

FIG. 3 is a cross-sectional side view of an exemplary holographic storage medium 50 according to one embodiment of the invention. As illustrated, medium 50 comprises a first substrate 52, a second substrate 54, and a holographic recording material 56 sandwiched between the respective substrates 52, 54. Other constructions of holographic media, however, may also benefit from the teaching of this disclosure.

The substrates 52, 54 may comprise polycarbonate, polymethylmethacrylate (PMMA), amorphous polyolefin, glass or the like, and outer surfaces of one or both of the substrates 52, 54 may be coated with an anti-reflective coating. Fluid containment features (not shown) may be formed on substrates 52, 54, if desired, to help contain holographic recording material 56 during fabrication, e.g., prior to curing in situ.

Holographic recording material 56 may comprise a photosensitive recording material. For example, holographic recording material 56 may comprise a matrix polymer resulting from the mixture of two or more oligomeric components. A photoinitiator can be mixed in a first oligomeric component, and a write monomer can be mixed in a second oligomeric component. One or more additives may also be dissolved in the oligomeric components. Copending and commonly assigned application Ser. No. 10/186,378, filed Jun. 27, 2002 by Hegel et al. entitled RECORDING MATERIAL FORMULATIONS FOR HOLOGRAPHIC MEDIA, describes in detail various holographic material formulations that may be useful. The entire content of the above-identified application Ser. No. 10/186,378 is incorporated herein by reference. In other embodiments, however, a holographic recording medium consistent with the teaching herein, may assume any of a wide variety of other holographic recording configurations.

Holographic recording medium 50 also includes, in accordance with an embodiment of the invention, one or more elements 57A-57E (collectively elements 57) that create a reference beam 55 from a zero frequency Fourier component 58 of a data encoded object beam 59. For example, elements 57 may be formed, replicated, coated, or the like, on substrate 52. In other words, by way of example, elements 57 may comprise a replicated surface of substrate 52, a coating on the substrate, or may comprise particles dispersed and cured in the substrate, e.g., cured in situ during substrate fabrication. Elements 57 may be formed on the exterior surface of substrate 52 as illustrated, on an interior surface of substrate 52, or possibly on an interior non-surface portion of substrate 52.

In accordance with the invention, elements 57 may comprise any optical characteristics of medium 50 capable of optically directing a zero frequency Fourier component 58 of a data encoded object beam 59 to create reference beam 55 that interferes with higher order Fourier components 55 of the object beam 58 in recording material 56. The higher order Fourier components of object beam 59 comprise one or more components other than zero frequency Fourier component 59, i.e., non-zero frequency Fourier components.

Elements 57 may comprise refractive elements, diffractive elements, diffusive elements, or the like. Many details of the invention are provided below using the example where elements 57 comprise diffusive elements. The invention, however, is not necessarily limited in that respect, and may be realized with other types of elements 57 formed on medium 50 to optically direct the zero frequency Fourier component 58 of a data encoded object beam 59 to create a reference beam 55.

As mentioned above, elements 57 may comprise any of a wide variety of optical characteristics capable of optically directing a zero frequency Fourier component 58 of a data encoded object beam 59 to create reference beam 55 that interferes with higher order Fourier components of the object beam 58 in recording material 56. However, many details of the invention will be described in the context of elements 57 that comprise diffusive elements. In that case, elements 57 may comprise a replicated surface of substrate 52, a diffusive coating, a collection of diffusive particles dispersed in substrate 52, or the like.

Element 57C, for example, can be designed to diffuse the zero frequency Fourier component 58 of object beam 59 in an ordered manner in terms of angular distribution, phase, and/or amplitude. In other words, elements 57 may include specific features to improve holographic recording. In general, a diffusive element on the medium can be used to create a reference beam that has specific characteristics, e.g., in terms of phase, angles, intensity, or the like. Such characteristics in a reference beam can improve holographic recording, e.g., by improving the ability to multiplex. Multiplexing refers to techniques in which holograms are recorded in the medium in an overlapping or partially overlapping manner.

Desirable characteristics in a reference beam in terms of angles, phase, intensity, or the like, may increase storage densities associated with a given holographic recording medium, and may also improve storage integrity. In particular, the ability to reconstruct multiplexed holograms may be improved if the reference beam is created to have defined characteristics of phase, angles, amplitude, and the like. Elements 57 may comprise a diffusive film, a diffusive coating, a replicated element of substrate 52, optically diffusive particles dispersed in substrate 52 in a random or ordered manner, a holographic optical element (HOE), or the like.

In some cases, elements 57 used to create a reference beam from a zero frequency Fourier component of the data encoded object beam may randomly diffuse the zero frequency Fourier component. In other cases, the diffusion may be ordered, i.e., specifically defined so that a reference beam with desirable characteristics is obtained. For example, by creating elements 57 to cause diffusion of the zero frequency Fourier component of the data encoded object beam only in defined angles, improvements may be achieved in terms of efficient use of the photopolymer recording material, e.g., which can improve storage capacity.

In other cases, characteristics of the reference beam may be defined by elements 57, such as phase, amplitude, or the like. For example, specifically defining the phase of the reference beam to include desired phase content may allow for improved multiplexing on the medium. In that case, elements 57 may comprise diffusing elements referred to as phase masks.

A diffusive element in the form of a phase mask refers to a structure that, when illuminated by a phase-ordered beam, yields a phase beam. A phase-ordered beam refers to a single ray or set of rays of continuously varying angles, e.g., a plane wave, or a converging or diverging beam. The auto-correlation function of a phase-ordered beam is substantially equal to its cross-sectional area. In contrast, a phase beam refers to a beam having many rays of varying angles of incidence and non-uniform phase content to result in an auto-correlation function adequate for needed selectivity. Beams of deterministic ray and phase content are phase beams. A diffusive element in the form of a phase mask yields a phase beam when illuminated by a phase-ordered beam. The use of phase beams as the reference beam can substantially improve the ability to multiplex bitmaps on the medium.

Phase selectivity can be used to improve differentiation of overlapping holograms in a holographic recording medium. A phase mask, e.g., having a checkerboard-like configuration, can introduce desired phase content into the reference beam which can improve the ability to differentiate holograms of an overlapping series. Such phase correlation multiplexing may be independent of Bragg selectivity techniques, which are sometimes used to facilitate multiplexing of holograms. In any case, introduction of phase selectivity in a self-referenced holographic recording system, e.g., using a diffusive element, may improve the system.

Still other characteristics of the reference beam may also be defined by elements 57, such as amplitude of the beam, or possibly other characteristics, such as polarization. If a desired polarization is needed, the elements 57 may comprise diffusive polarizers. In any case, elements 57 in the form of diffusive elements allow the ability to create reference beams having desirable characteristics, such as randomness, or desired phase, desired amplitude, desired angular distribution, desired polarization, and the like. By incorporating elements 57 as part of the medium 50, the need for separate optical elements to create the reference beam in a holographic recording system can be avoided, and alignment problems with such separate optical elements can be reduced or avoided.

FIGS. 4-7 are exemplary top views of media 62, 64, 66 and 68 respectively. Medium 62 (FIG. 4) includes a plurality of diffusive elements 61 (for simplicity, only elements 61A-61F are labeled). In particular, diffusive elements 61 may comprise diffusive square patches (or other shapes) arranged on medium 62 such that upon illumination of medium 62 with a data encoded object beam, one of diffusive elements 61 can create a reference beam from a zero frequency Fourier component of a data encoded object beam. On medium 64 (FIG. 5) and medium 66 (FIG. 6), diffusive elements 63 and 65, respectively, are arranged as bands. On medium 68 (FIG. 7), diffusive elements 67 are arranged as bands defined by (r, θ) locations on the medium, i.e., locations defined by radial location and angle. A wide variety of other arrangements of diffusive elements could also be used in accordance with the invention.

Figure 8:
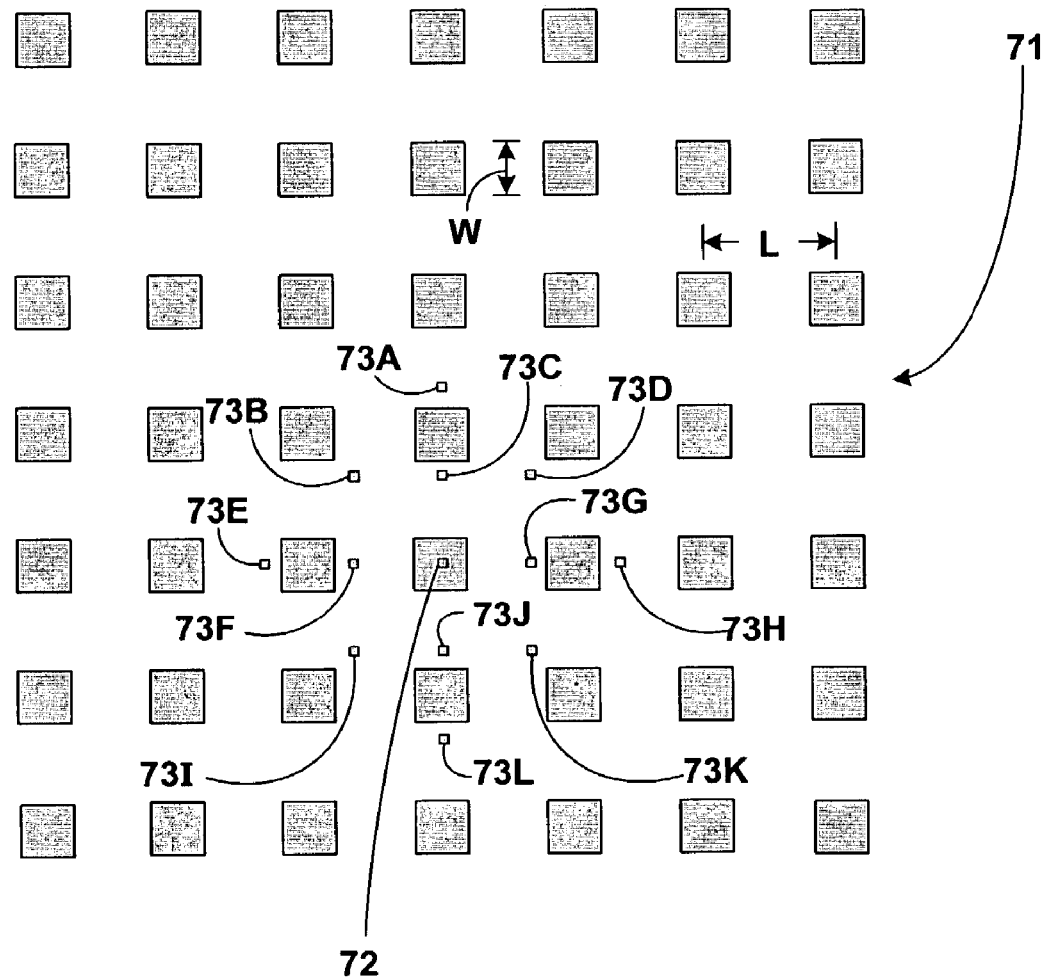
FIGS. 8-10 illustrate a set of diffusive elements that can be formed on a holographic medium to facilitate self-referenced holography.

FIG. 8 illustrates a set of diffusive elements 71 that can be formed on a holographic medium to facilitate self-referenced holography. In particular, elements 71 may comprise diffusive patches similar to those of medium 62 illustrated in FIG. 4. Also illustrated in FIG. 8 is a collection of Fourier components 72 and 73A-73L of a data encoded object beam. Elements 71 can be arranged such that when a zero frequency Fourier component 72 is aligned with one of elements 71, while higher order Fourier components 73A-73L, i.e., non-zero frequency Fourier components, are not aligned with one of diffusive elements 71. In that case, higher order Fourier components 73 can pass through to illuminate the recording material. Accordingly, the zero frequency Fourier component 72 is diffused to interfere with higher order components 73 in order to create a hologram in the associated medium. The arrangement of elements 71 may be defined in order to ensure that a desired amount of higher order Fourier components 73 can pass between the diffusive elements 71 when a zero frequency Fourier component 72 is aligned with one of elements 71.

The spacing of diffusive elements 71 may be specifically defined relative to the collection of Fourier components 72, 73 in order to ensure that enough of higher order components 73 pass through the regions between elements 71. In particular, length (L) and width (W) may be selected based on the distance of separation between respective Fourier components 72, 73.

The separation of Fourier components is generally given by the following equation:

$$S=2f\lambda/p,$$

where S is the separation, f is the lens focal length, $\lambda$ is the wavelength of laser light, and p is the pitch between SLM pixels. In one example, separation between respective adjacent Fourier components 72, 73 is approximately 0.75 mm when the holographic system (FIG. 1) includes an SLM bitmap defining a pitch of approximately 17 microns, a Fourier transform lens having a focal length of 12 mm and a wavelength of laser light of 532 nm. In that case, length (L) may be selected to be approximately 1.0 mm and width (W) may be selected to be approximately 0.25 mm. Such defined lengths and widths can ensure that if zero frequency Fourier component 72 is aligned with one of elements 71, first, second and third order Fourier components (only first and second order illustrated in FIG. 8) would substantially align to regions between elements 71. Thus, by selecting length (L) and width (W) based on the distance of separation between respective Fourier components 72, 73 of the specific system, desired resolutions can be achieved.

Figure 9:
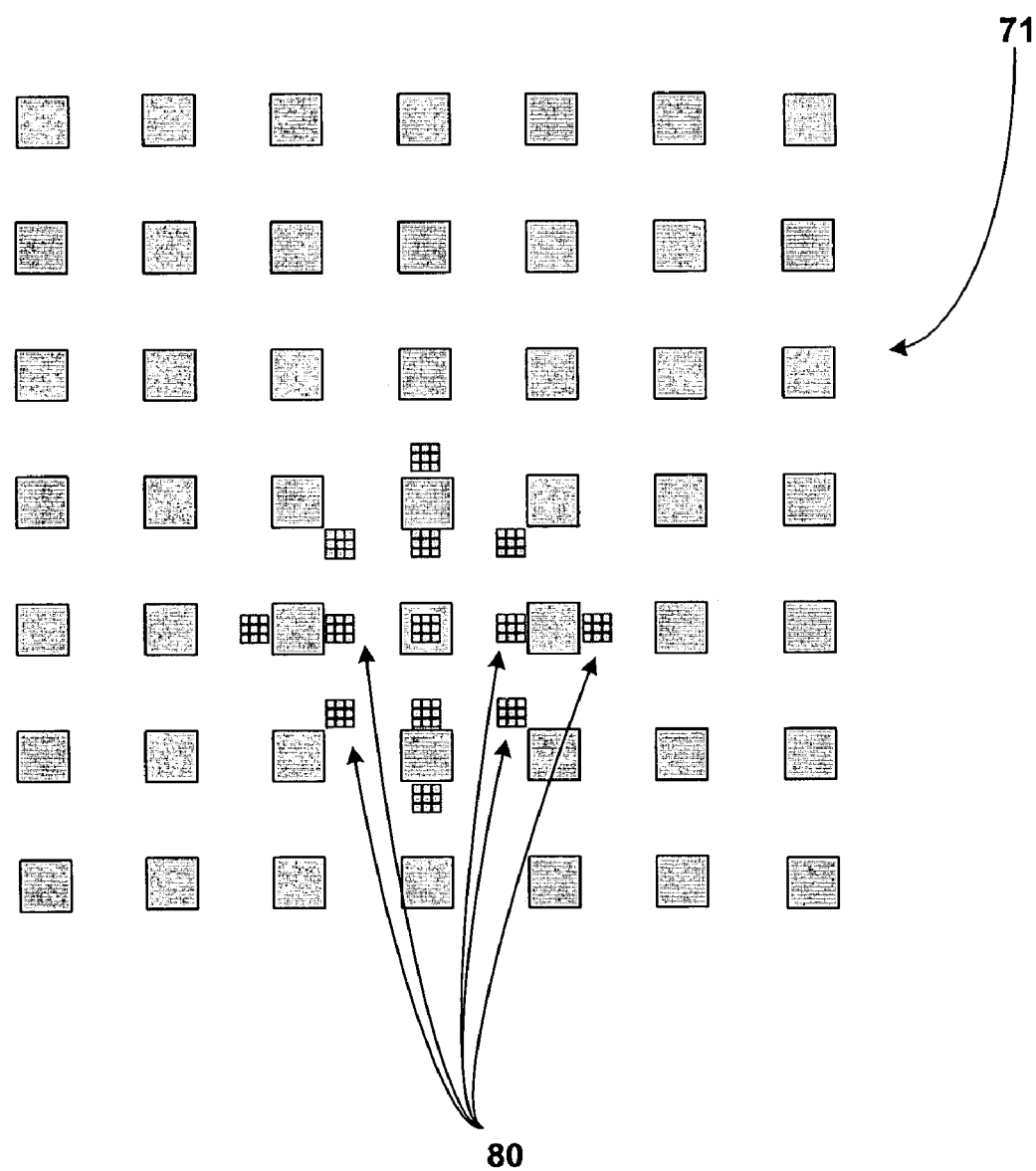

FIG. 9 is another illustration similar to that of FIG. 8 showing a set of diffusive elements 71 that can be formed on a holographic medium to facilitate self-referenced holography. As illustrated in FIG. 9, various different collections of Fourier components 80 can be aligned on medium in shifted linear directions relative to one another. In this manner, multiplexing can be achieved. As outlined above, diffusive characteristics of elements 71 may improve the ability to reconstruct such multiplexed bitmaps corresponding to the different collections of Fourier components 80 illustrated in FIG. 9.

Figure 10:
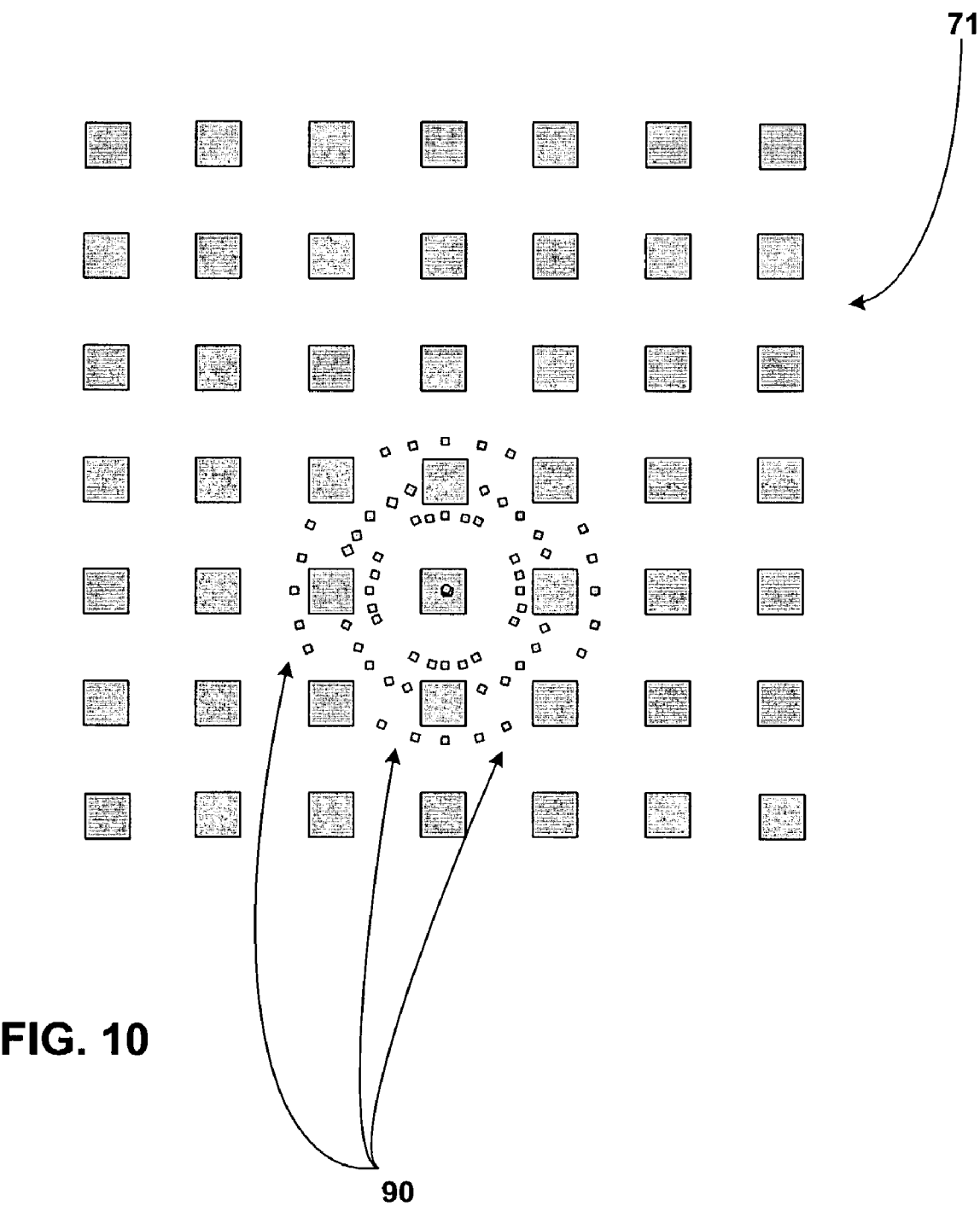

FIG. 10 is yet another illustration similar to that of FIG. 8 showing a set of diffusive elements 71 that can be formed on a holographic medium to facilitate self-referenced holography. As illustrated in FIG. 10, various different collections of Fourier components 90 can be aligned on medium in shifted angular directions relative to one another. In this additional or alternative manner, multiplexing can be achieved. In other words, sets of Fourier components may be shifted in linear directions as illustrated in FIG. 9, angular directions as illustrated in FIG. 10 or shifted in both linear and angular directions. In any case, diffusive characteristics of elements 71 may improve the ability to reconstruct such multiplexed bitmaps corresponding to the different collections of Fourier components.

Figure 11:
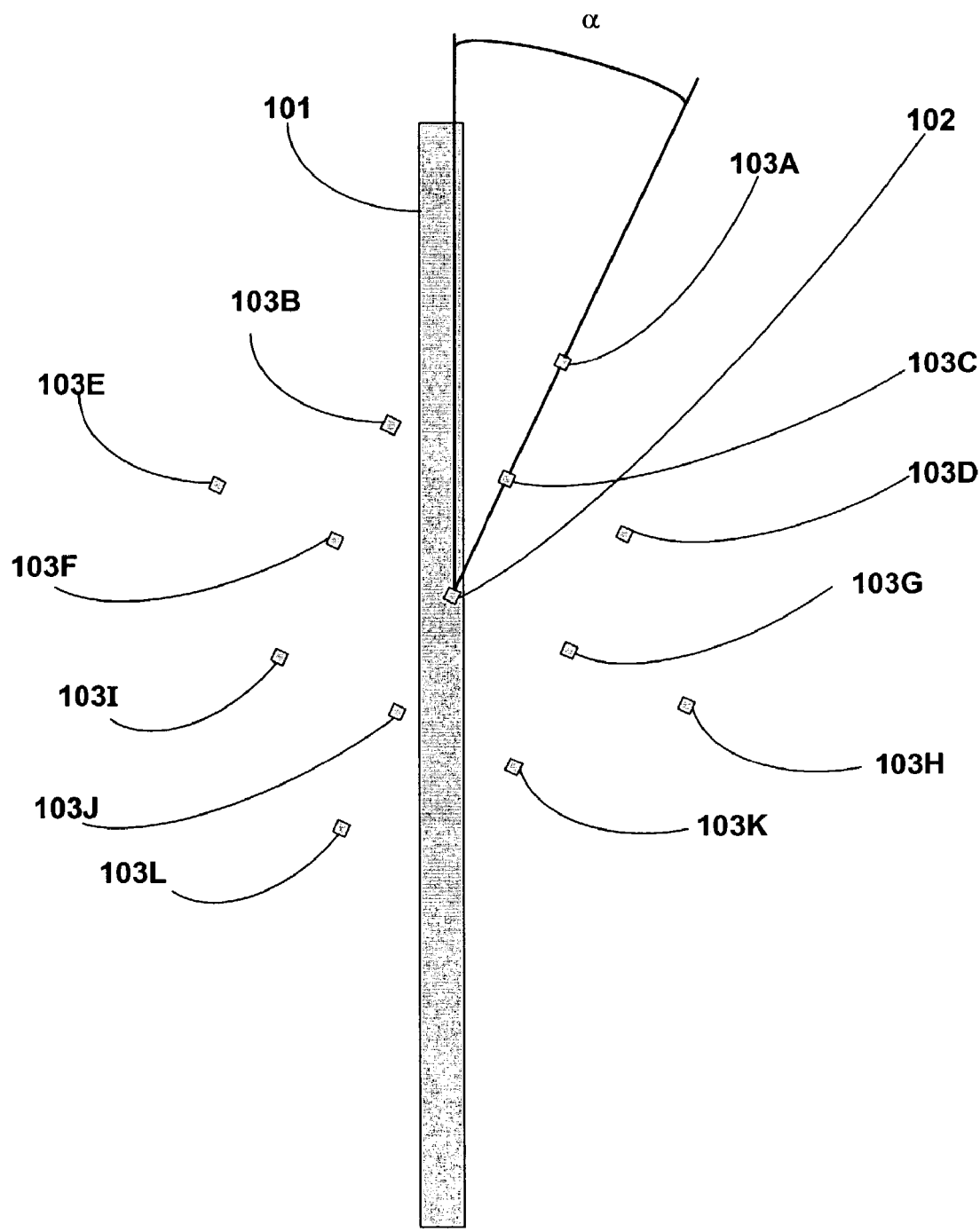
FIGS. 11 and 12 illustrate a diffusive band that can be formed on a holographic medium to facilitate self-referenced holography.

FIG. 11 illustrates a diffusive band 101 that can be formed on a holographic medium to facilitate self-referenced holography. In particular, band 101 may comprise diffusive bands similar to those of medium 64 illustrated in FIG. 5 or medium 66 illustrated in FIG. 6. Also illustrated in FIG. 11 is a collection of Fourier components 102 and 103A-103L of a data encoded object beam. Band 101 can be arranged relative to Fourier components 102, 103 such that when a zero frequency Fourier component 102 is aligned with band 101, higher order Fourier components 103, i.e., non-zero frequency Fourier components, are not aligned with band 101. Fourier components 102, 103 may be angularly shifted relative to band, e.g., by an angle ($\alpha$) defined to ensure that higher order components 103 do not align with band 101. Thus, higher order Fourier components 103 can pass through to illuminate the recording material, and zero frequency Fourier component 102 can be diffused by band 101 to interfere with higher order components 103 in the recording material to create a hologram.

Figure 12:
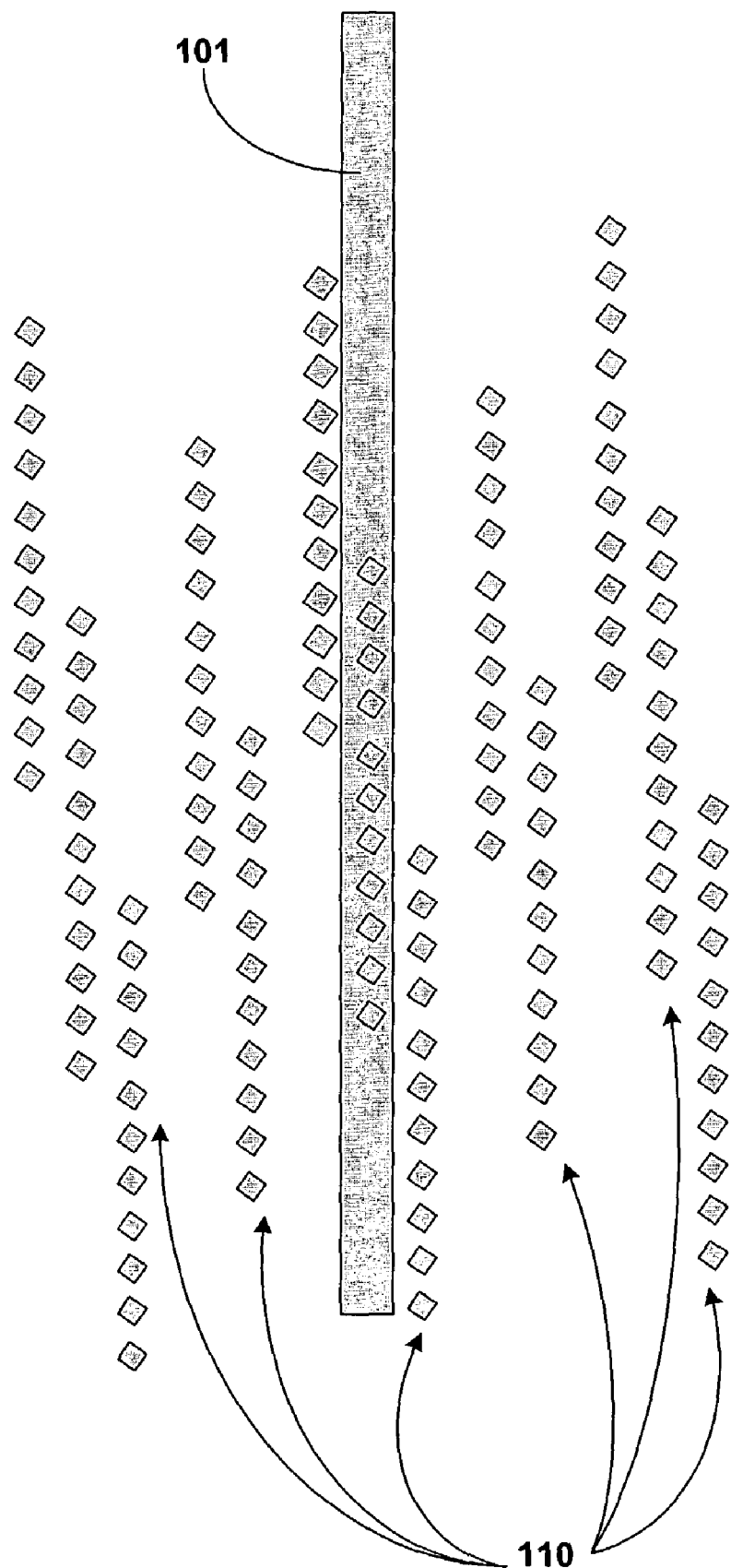

FIG. 12 is another illustration similar to that of FIG. 11 showing a diffusive band 101 that can be formed on a holographic medium to facilitate self-referenced holography. As illustrated in FIG. 12 various different collections of Fourier components 110 can be aligned on medium in shifted angular directions relative to band 110 and shifted linear directions relative to one another. In this manner, multiplexing can be achieved. As outlined above, diffusive characteristics of band 101 may improve the ability to reconstruct such multiplexed bitmaps corresponding to the different collections of Fourier components 110 illustrated in FIG. 12.

Figure 13:
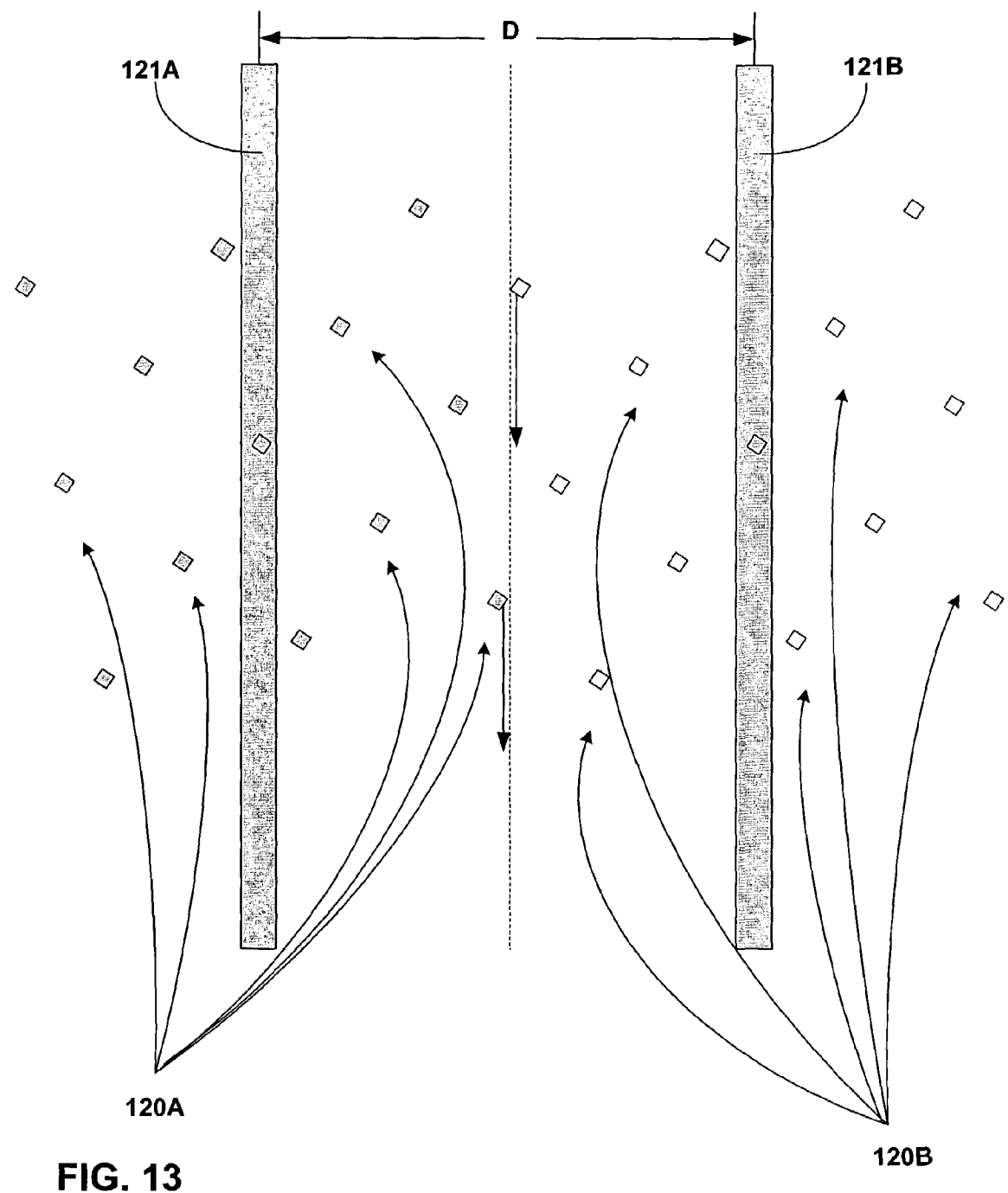
FIG. 13 illustrates a set of diffusive bands that can be formed on a holographic medium to facilitate self-referenced holography.

FIG. 13 is another illustration, showing two diffusive bands 121A, 121B of a holographic medium. A distance (D) may be selected based on the distance of separation between respective Fourier components 120A, 120B. In particular, distance (D) may be selected so as to achieve a desired resolution in the holographic system, in terms of the number of higher level Fourier components 120A, 120B that can reside between bands 121A, 121B without substantial overlap. In that case, multiplexing may be performed only in the linear direction defined by the major length of bands 121A, 121B, e.g., similar to the illustration in FIG. 12.

By way of example, the distance between bands 121A and 121B may be selected as approximately 2.85 (or greater) multiplied by the Fourier spacing, i.e., the spacing between adjacent components of 120A or adjacent components of 120B. Such spacing may ensure that all of the first and second order Fourier components could reside between bands 121A and 121B without overlap. Larger spacing may allow for even improved resolution, i.e., improved ability to reconstruct stored holograms, but may reduce storage capacity.

For example, if separation between respective Fourier components, e.g., separation between the components of 120A or the components of 120B, is approximately 0.75 mm, distance (D) between bands 121A, 121B may be selected to be approximately 2.1 mm in order to avoid overlap of first and second order Fourier components, e.g., allowing for at least a 5 by 5 Fourier component pixel array for each bitmap. Another variable that may be selected is the angular shift, e.g., angle ($\alpha$), as illustrated in FIG. 11. By selecting these variables, a holographic system-having acceptable resolution can be achieved. Moreover, diffusive characteristics of bands 121A, 121B may improve the ability to reconstruct such multiplexed bitmaps corresponding to the different collections of Fourier components 120A, 120B illustrated in FIG. 13.

Various embodiments of the invention have been described. For example, self-referenced holographic recording techniques have been described for use with holographic data storage media. In particular, self-referenced holography making use of an element of a holographic medium to create a reference beam from a zero frequency Fourier component of a data encoded object beam has been described. These and other embodiments are within the scope of the following claims.

The invention claimed is:

1. A holographic medium comprising:
    a holographic recording material; and
    an element to create a reference beam from a zero frequency Fourier component of a data encoded object beam directed at the medium.

2. The holographic medium of claim 1, wherein the holographic recording material forms a hologram upon interference of the reference beam and non-zero frequency Fourier components of the object beam in the holographic recording material.

3. The holographic medium of claim 1, wherein the holographic medium includes two substrates that sandwich the holographic recording material, wherein the element is formed on one of the substrates.

4. The holographic medium of claim 1, further comprising a plurality of elements formed on the medium to create reference beams from zero frequency Fourier components of data encoded object beams directed at the medium.

5. The holographic medium of claim 4, wherein the elements comprise diffusive patches.

6. The holographic medium of claim 4, wherein the elements comprise diffusive bands.

7. The holographic medium of claim 1, wherein the element comprises a diffusive element formed on the medium.

8. The holographic medium of claim 7, wherein the diffusive element comprises a phase mask formed on the medium and the reference beam comprises a phase beam created from the a zero frequency Fourier component of the data encoded object beam.

9. The holographic medium of claim 7, wherein the holographic medium includes two substrates that sandwich the holographic recording material and wherein the diffusive element comprises a replicated surface of a substrate of the medium.

10. The holographic medium of claim 7, wherein the diffusive element comprises diffusive particles dispersed in a resin.

11. The holographic medium of claim 7, wherein the diffusive element comprises a holographic optical element (HOE).

12. A method comprising:
    optically directing a zero frequency Fourier component of a optical beam using an element formed on a holographic medium to create a second optical beam, wherein the first optical beam is encoded with data; and
    illuminating a recording material of the holographic medium with the second optical beam and non-zero frequency Fourier components of the first optical beam.

13. The method of claim 12, further comprising optically directing only the zero frequency Fourier component of the first optical beam using the element formed on the holographic medium.

14. The method of claim 12, further comprising optically directing the first optical beam and the second optical beam along a common optical path.

15. The method of claim 12, wherein the first optical beam is an object beam and the second optical beam is a reference beam.

16. The method of claim 12, wherein the element formed on the medium comprises a diffusive element.

17. The method of claim 16, wherein the diffusive element comprises a phase mask element formed on the medium and the second optical beam comprises a phase beam created from the zero frequency Fourier component of the first optical beam by the phase mask element.

18. The method of claim 16, wherein the diffusive element comprises a replicated surface of a substrate of the medium.

19. The method of claim 16, wherein the diffusive element comprises optically diffusive particles dispersed in a resin.

20. The method of claim 16, wherein the diffusive element comprises a holographic optical element (HOE).

21. The method of claim 12, further comprising optically directing the zero frequency Fourier component of the first optical beam in a phase selective manner using the element formed on the medium to create the second optical beam, the second optical beam being a phase beam.

22. The method of claim 12, wherein the second optical beam is substantially randomized by the element formed on the medium.

23. A holographic data storage system comprising:
   a laser to produce light;
   one or more optical elements to condition the light produced by the laser to create an object beam;
   a data encoder to encode data in the object beam; and
   a holographic medium including a holographic recording material and an element formed on the medium to create a reference beam from a zero frequency Fourier component of a data encoded object beam, wherein the reference beam and non-zero frequency Fourier components of the object beam interfere in the holographic recording material to create a hologram.

24. The holographic data storage system of claim 23, further comprising a data detector to detect data in the hologram when the hologram is illuminated by the reference beam only.

25. The holographic data storage system of claim 23, wherein the element formed on the medium comprises a diffusive element.

* * * * *